(12) United States Patent
Tanaka et al.

(10) Patent No.: US 11,595,558 B2
(45) Date of Patent: Feb. 28, 2023

(54) APPARATUS AND METHOD FOR MEASURING CRACKS IN WALL SURFACE

(71) Applicant: TOPCON CORPORATION, Tokyo (JP)

(72) Inventors: Takashi Tanaka, Tokyo (JP); Takeshi Kikuchi, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 324 days.

(21) Appl. No.: 16/990,582

(22) Filed: Aug. 11, 2020

(65) Prior Publication Data

US 2021/0067670 A1 Mar. 4, 2021

(30) Foreign Application Priority Data

Sep. 4, 2019 (JP) .............................. JP2019-160880

(51) Int. Cl.
| | |
|---|---|
| *H04N 5/225* | (2006.01) |
| *G01B 9/02* | (2022.01) |
| *G01B 11/00* | (2006.01) |
| *G01B 11/14* | (2006.01) |
| *G01B 11/26* | (2006.01) |

(Continued)

(52) U.S. Cl.
CPC ....... *H04N 5/2258* (2013.01); *G01B 9/02041* (2013.01); *G01B 11/002* (2013.01); *G01B 11/14* (2013.01); *G01B 11/26* (2013.01); *G06T 7/0002* (2013.01); *H04N 5/2256* (2013.01);
(Continued)

(58) Field of Classification Search
CPC ...... H04N 5/2258; H04N 5/2256; H04N 5/33; G01B 9/02041; G01B 11/002; G01B 11/14; G01B 11/26; G01B 21/085; G01B 11/303; G06T 7/0002; G06T 2207/10048; G06T 2207/20224; G06T 2207/30108; G06T 7/0004; G01N 21/954; G01N 21/8806;

(Continued)

(56) References Cited

U.S. PATENT DOCUMENTS

| | | | |
|---|---|---|---|
| 2009/0135401 A1* | 5/2009 | Nakaniwa | ............ G01C 15/002 356/625 |
| 2013/0178759 A1 | 7/2013 | Karpiloff | |

(Continued)

FOREIGN PATENT DOCUMENTS

JP 2010216829 A 9/2010

*Primary Examiner* — Gevell V Selby
(74) *Attorney, Agent, or Firm* — Thomas W. Cole; Calderon Safran & Cole P.C.

(57) ABSTRACT

A crack measuring apparatus includes distance-measuring units, an image pickup unit having pixels the positions of which are identified on an imaging device, an infrared image pickup unit having pixels the positions of which are identified on an imaging device and having sensitivity to infrared rays, driving units, angle-measuring units, and an arithmetic control unit, the arithmetic control unit searches for a cracked portion from a temperature difference in an infrared image by turning the infrared image pickup unit, captures an image of the cracked portion by the image pickup unit and identifies a position of the cracked portion from a density difference in the captured image, measures the position of the cracked portion by the distance-measuring units and the angle-measuring units, and acquires three-dimensional absolute coordinates of the cracked portion.

7 Claims, 7 Drawing Sheets

(51) Int. Cl.
  *G06T 7/00* (2017.01)
  *H04N 5/33* (2006.01)
(52) U.S. Cl.
  CPC ..... *H04N 5/33* (2013.01); *G06T 2207/10048* (2013.01); *G06T 2207/20224* (2013.01)
(58) Field of Classification Search
  CPC ....... G01N 21/8851; G01N 2021/8861; G01C 15/00; G01C 1/04
  See application file for complete search history.

(56) References Cited

U.S. PATENT DOCUMENTS

| | | | |
|---|---|---|---|
| 2013/0278759 A1 | 10/2013 | Zimmermann et al. | |
| 2018/0095174 A1* | 4/2018 | Mertz | G01B 11/002 |
| 2018/0293725 A1* | 10/2018 | Ohshima | G01N 21/88 |
| 2019/0078883 A1 | 3/2019 | Yuasa et al. | |
| 2019/0339209 A1* | 11/2019 | Du | G01M 3/38 |
| 2020/0275666 A1* | 9/2020 | Carney | A01N 25/02 |

* cited by examiner

APPARATUS AND METHOD FOR MEASURING CRACKS IN WALL SURFACE

TECHNICAL FIELD

The present invention relates to an apparatus and a method for measuring cracks in a wall surface of a structural object.

BACKGROUND ART

To investigate a distribution status of cracks in a large concrete structural object such as a building, an iron bridge, and a tunnel, a surveying instrument (total station) that measures a distance and an angle to a measurement point has been used. Conventionally, at a survey site, manual operation has been performed in which scaffolding is built and an operator marks and makes notes of cracked portions while visually checking the cracked portions, or installs a reflecting object near the cracked portion and performs collimation. Recently, non-prism measurement has enabled performing collimation without a reflecting object, however, collimation of a cracked portion as a target has manually been performed and taken a lot of time.

On the other hand, for example, Patent Literature 1 discloses a defect inspection device that includes a captured image pickup unit and an infrared image pickup unit, identifies the vicinity of a cracked portion from an infrared image, detects the vicinity of the cracked portion in a captured image, identifies the position of the cracked portion based on a density difference in the captured image, and measures dimensions of the cracked portion.

CITATION LIST

Patent Literature

Japanese Published Unexamined Patent Application No. 2010-216829

SUMMARY OF INVENTION

Technical Problem

However, the apparatus disclosed in Patent Literature 1 has a problem in which it is difficult to match measurement positions of the infrared image and the captured image. In other apparatuses as well, higher-order consideration and an operation time are required to associate data acquired by a plurality of sensors, and an operation of processing the data is required after the measurement.

The present invention was made in view of this problem, and an object thereof is to provide a crack measuring apparatus and a method in which operations relating to three-dimensional measurements of a cracked portion in a structural object are automated as a series of operations.

Solution to Problem

In order to achieve the object described above, a crack measuring apparatus according to an aspect of the present invention includes a distance-measuring unit that measures a distance to a target by emitting distance-measuring light to the target and receiving reflected distance-measuring light, an image pickup unit having pixels the positions of which are identified on an imaging device, an infrared image pickup unit that has pixels the positions of which are identified on an imaging device and has sensitivity to infrared rays, a driving unit that turns the distance-measuring unit, the image pickup unit, and the infrared image pickup unit in a horizontal direction and a vertical direction, an angle-measuring unit that measures rotation angles in the horizontal direction and the vertical direction of the distance-measuring unit, the image pickup unit, and the infrared image pickup unit, and an arithmetic control unit that controls the distance-measuring unit, the angle-measuring unit, the image pickup unit, the infrared image pickup unit, and the driving unit, wherein the arithmetic control unit performs a search for a cracked portion from a temperature difference in an infrared image by turning the infrared image pickup unit, captures an image of the cracked portion by the image pickup unit and identifies a position of the cracked portion from a density difference in the captured image, measures the position of the cracked portion by the distance-measuring unit and the angle-measuring unit and acquires three-dimensional absolute coordinates of the cracked portion.

In the aspect described above, it is also preferable that the image pickup unit and the infrared image pickup unit have an orthogonal coordinate system having an origin set to an optical axis of the distance-measuring light.

In the aspect described above, it is also preferable that the arithmetic control unit performs the search a plurality of times while narrowing the temperature difference set in the infrared image pickup unit in a phased manner.

In the aspect described above, it is also preferable that the arithmetic control unit acquires three-dimensional absolute coordinates of each of a start point, a break point, and a terminal point of the cracked portion.

In the aspect described above, it is also preferable that the arithmetic control unit measures a length and a shape of a crack based on the three-dimensional absolute coordinates of the cracked portion, and measures a thickness of the crack from the number of pixels of the image pickup unit.

In the aspect described above, it is also preferable that the distance-measuring unit, the angle-measuring unit, the image pickup unit, and the infrared image pickup unit are integrated into one apparatus.

In addition, a crack measuring method according to an aspect of the present invention includes (a) a step of searching for a cracked portion from a temperature difference in an infrared image by turning an infrared image pickup unit, (b) a step of identifying a position of the cracked portion by capturing an image of the cracked portion searched for in Step (a) by the image pickup unit from a density difference in the captured image; and (c) a step of acquiring three-dimensional absolute coordinates by measuring a distance and an angle to the position of the cracked portion identified in Step (b) by a distance-measuring unit and an angle-measuring unit.

Effect of Invention

According to the crack measuring apparatus and method of the present invention, a series of measurements operations for acquiring three-dimensional measurements of a cracked portion in a structural object are automated.

DESCRIPTION OF EMBODIMENTS

Next, a preferred embodiment of the present invention is described with reference to the drawings.

Figure 1:
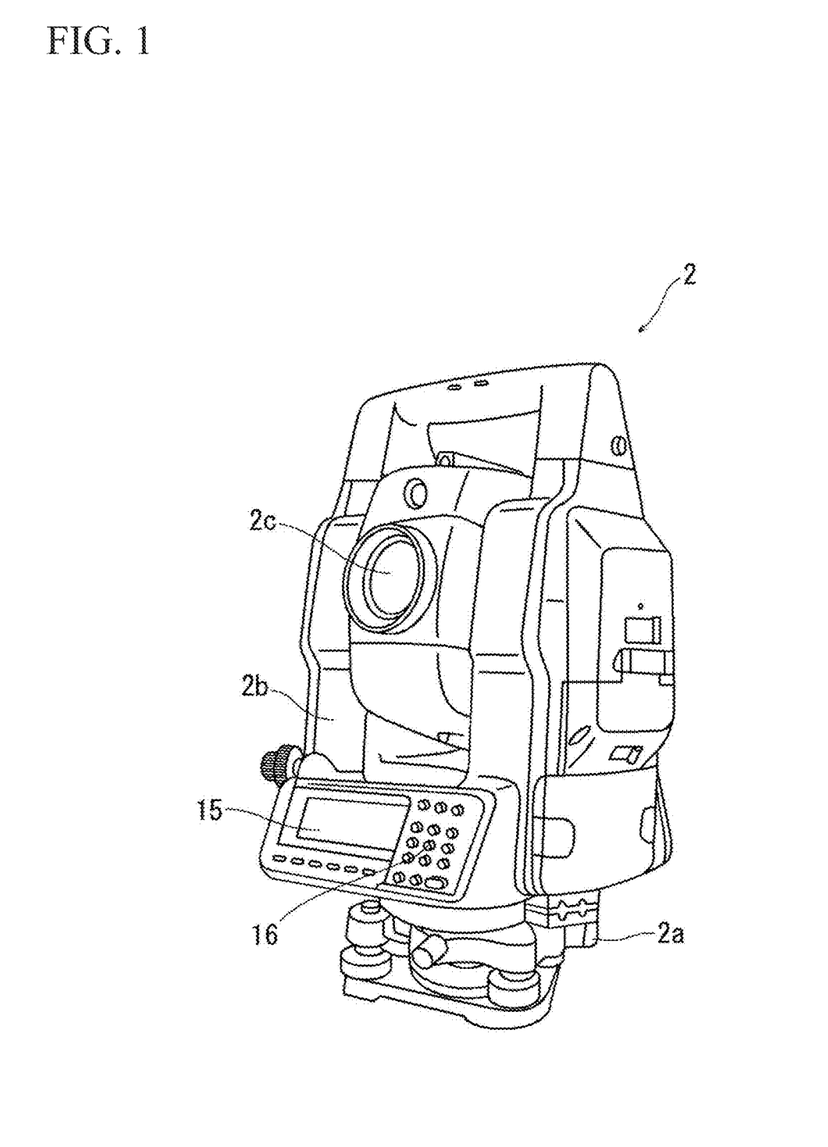
FIG. 1 is an external perspective view of a measuring apparatus according to an embodiment.

FIG. 1 is an external perspective view of a measuring apparatus according to an embodiment. A crack measuring apparatus 2 (hereinafter, simply referred to as the measuring apparatus 2) is a total station. The measuring apparatus 2 includes a base portion 2a provided on a leveling device, a bracket portion 2b that rotates horizontally on the base portion 2a, a telescope 2c that rotates vertically at the center of the bracket portion 2b, and a display unit 15 and an operation unit 16 provided on the front surface of the bracket portion 2b.

Figure 2:
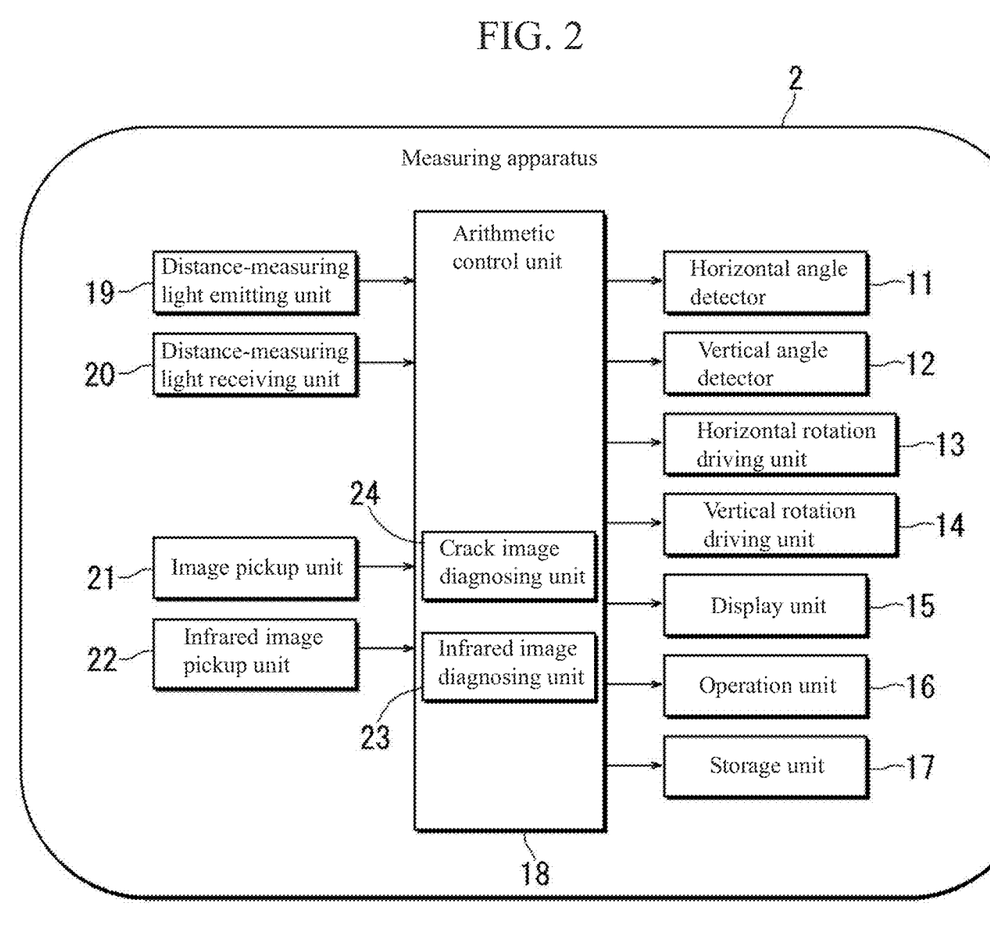
FIG. 2 is a configuration block diagram of the same measuring apparatus.

FIG. 2 is a configuration block diagram of the measuring apparatus 2. The measuring apparatus 2 includes a horizontal angle detector 11, a vertical angle detector 12, a horizontal rotation driving unit 13, a vertical rotation driving unit 14, the display unit 15, the operation unit 16, a storage unit 17, an arithmetic control unit 18, a distance-measuring light emitting unit 19, a distance-measuring light receiving unit 20, an image pickup unit 21, and an infrared image pickup unit 22.

The horizontal rotation driving unit 13 and the vertical rotation driving unit 14 are motors, and are controlled by the arithmetic control unit 18. The horizontal rotation driving unit 13 rotates the bracket portion 2b in the horizontal direction, and the vertical rotation driving unit 14 rotates the telescope 2c in the vertical direction.

The horizontal angle detector 11 and the vertical angle detector 12 are encoders. The horizontal angle detector 11 measures a rotation angle of the bracket portion 2b in the horizontal direction, and the vertical angle detector 12 measures a rotation angle of the telescope 2a in the vertical direction.

The display unit 15 has a liquid crystal display screen, and also accepts touch-panel inputs. On the liquid crystal display screen, images relating to a measurement application are displayed, and an operator performs measurements by being guided by the images.

The operation unit 16 includes numeric keys, a decimal key, plus/minus keys, an enter key, and a scroll key, etc., and can, for example, select, determine, and cancel operations displayed on the display unit 15.

The distance-measuring light emitting unit 19 includes a light emitting element and a light transmitting optical system, and emits distance-measuring light such as an infrared laser to a target. The distance-measuring light receiving unit 20 includes a light receiving element and a light receiving optical system that shares optical elements with the light transmitting optical system, and receives reflected distance-measuring light from the target.

The image pickup unit 21 is, for example, a CCD, a CMOS sensor, or the like, having an aggregate of pixels. In the image pickup unit 21, positions of the respective pixels are identified based on an orthogonal coordinate system having an origin set to an optical axis of the distance-measuring light on an imaging device. The image pickup unit 21 is simultaneously used as an element constituting a tracking unit which acquires two images of a turned-on image and a turned-off image of distance-measuring light, and detects the target position from a difference between these images, and automatically tracks a target by regarding a position whose deviation from a visual axis center of the telescope 2c is within a certain value as the target position. The tracking unit is an optional component in the present embodiment, so that description of this is omitted.

The infrared image pickup unit 22 is a CCD, a CMOS sensor, or the like having sensitivity to infrared rays, and captures an image of radiation heat radiated from an image-capturing object with infrared rays and images a temperature distribution in the image-capturing object. In the infrared image pickup unit 22, positions of the respective pixels are identified based on an orthogonal coordinate system having an origin set to an optical axis of the distance-measuring light on an imaging device.

The arithmetic control unit 18 is a control unit configured by mounting at least a CPU and a memory (RAM, ROM, etc.) on an integrated circuit. The arithmetic control unit 18 calculates a distance measurement value to the target from a phase difference between the reflected distance-measuring light and reference light having advanced along a reference light path provided in the optical systems described above. In addition, the arithmetic control unit 18 calculates an angle measurement value of the target from measurement values of the horizontal angle detector 11 and the vertical angle detector 12. The arithmetic control unit 18 includes an infrared image diagnosing unit 23 and a crack image diagnosing unit 24. The infrared image diagnosing unit 23 applies data processing to an infrared image acquired by the infrared image pickup unit 22. The crack image diagnosing unit 24 applies data processing to the captured image acquired by the image pickup unit 21. These data processing are described later.

The storage unit 17 is, for example, a memory card, an HDD, or the like. In the storage unit 17, a measurement program to be executed by the arithmetic control unit 18 is stored. In addition, various plural of information acquired by the arithmetic control unit 18 are recorded.

The horizontal angle detector 11, the vertical angle detector 12, the horizontal rotation driving unit 13, the vertical rotation driving unit 14, the storage unit 17, and the arithmetic control unit 18 are provided inside a housing of the bracket portion 2b, and the distance-measuring light emitting unit 19, the distance-measuring light receiving unit 20, the image pickup unit 21, and the infrared image pickup unit 22 are provided inside a housing of the telescope 2c. The distance-measuring light emitting unit 19, the distance-measuring light receiving unit 20, and the arithmetic control unit 18 are distance-measuring units. The horizontal angle detector 11, the vertical angle detector 12, and the arithmetic control unit 18 are angle-measuring units. Concerning dispositions inside the telescope 2c, the image pickup unit 21 and the infrared image pickup unit 22 have deviations known in advance of positions in the horizontal direction and the vertical direction with respect to an optical axis of the distance-measuring light.

Figure 3:
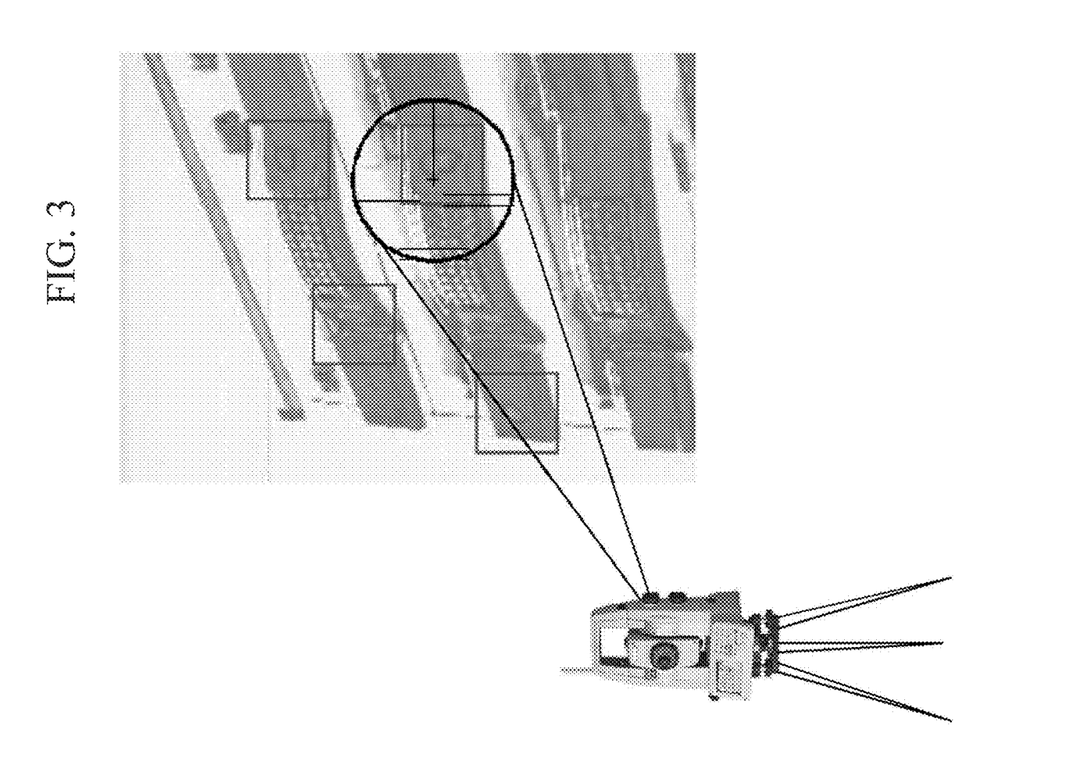
FIG. 3 is an imaginary view of a measuring operation by the same measuring apparatus.

FIG. 3 is an imaginary view of a measuring operation by the measuring apparatus 2. The measuring apparatus 2 is installed at a known point by using a tripod, and adjusted by the leveling unit so as to become horizontal to an installation surface. After installing the measuring apparatus 2, an operator is only required to turn on the power supply of the measuring apparatus 2, select a crack measurement mode, and make simple selection and inputs according to the application guidance.

Figure 4:
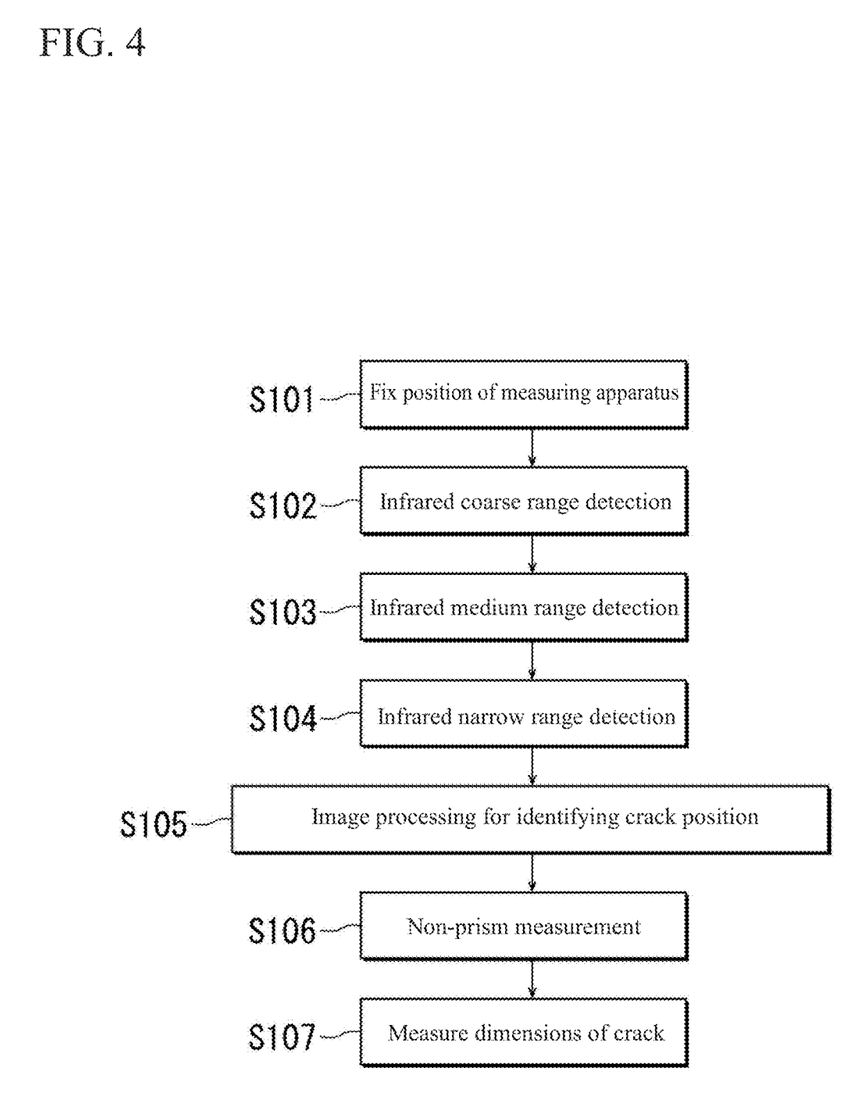
FIG. 4 is a measurement flowchart by the same measuring apparatus.

FIG. 4 is a measurement flowchart by the measuring apparatus 2.

When a measurement application of the crack measurement mode is started, first, in Step S101, a current position (three-dimensional absolute coordinates) of the measuring apparatus 2 is acquired by the arithmetic control unit 18. As the current position, coordinates are read out from the storage unit 17 when the apparatus is installed at a known point. When the installation point is not a known point, guidance is given by a measurement application for current position acquisition using a backward intersection method, and thereafter, the process returns to this step.

Next, the process shifts to Step S102, and the infrared image diagnosing unit 23 functions. The infrared image diagnosing unit 23 searches for (narrows down) a cracked portion by infrared rays. In Step S102, first, "coarse range detection" is performed. The infrared image diagnosing unit 23 performs an infrared measurement of the entirety of an inspection object, first, with temperature differences (image color differences) set to be coarse (for example, in units of 10 degrees), by using the infrared image pickup unit 22 while making the horizontal rotation driving unit 13 and the vertical rotation driving unit 14 collaborate with each other. In the coarse range detection, a measurement may be made in a wide range by using a wide-angle image, or a measurement may be made in a unicursal manner by using a narrow-angle image.

Next, the process shifts to Step S103, "medium range detection" is performed by the infrared image diagnosing unit 23. The infrared image diagnosing unit 23 performs an infrared measurement targeting a position with a temperature difference detected by the coarse range detection, with temperature differences set to be narrower (for example, in units of 1 degree) than in the coarse range detection, by using the infrared image pickup unit 22 while making the horizontal rotation driving unit 13 and the vertical rotation driving unit 14 collaborate with each other.

Next, the process shifts to Step S104, "narrow range detection" is performed by the infrared image diagnosing unit 23. The infrared image diagnosing unit 23 performs an infrared measurement targeting a position with a temperature difference detected by the medium range detection, with temperature differences set to be still narrower (for example, in units of 0.1 degrees) than in the medium range detection, by using the infrared image pickup unit 22 while making the horizontal rotation driving unit 13 and the vertical rotation driving unit 14 collaborate with each other.

In this way, the measuring apparatus 2 automatically searches for (narrows down) a cracked portion by recognizing a low-temperature portion (place with a high moisture content) as a crack while appropriately changing the temperature differences set in the infrared sensor. The number of times of coarse range detections and medium range detections to be performed are not limited, and for example, it is only necessary to perform the coarse range detection in units of, for example, sub-meters to one meter, and the setting is performed so that an inspection standards are met in the stage of the narrow range detection. It is also preferable that, by starting the crack measurement after a cracked portion is manually identified to some extent, the number of times of coarse range detections and medium range detections are reduced to short-cut the search flow.

Figure 5:
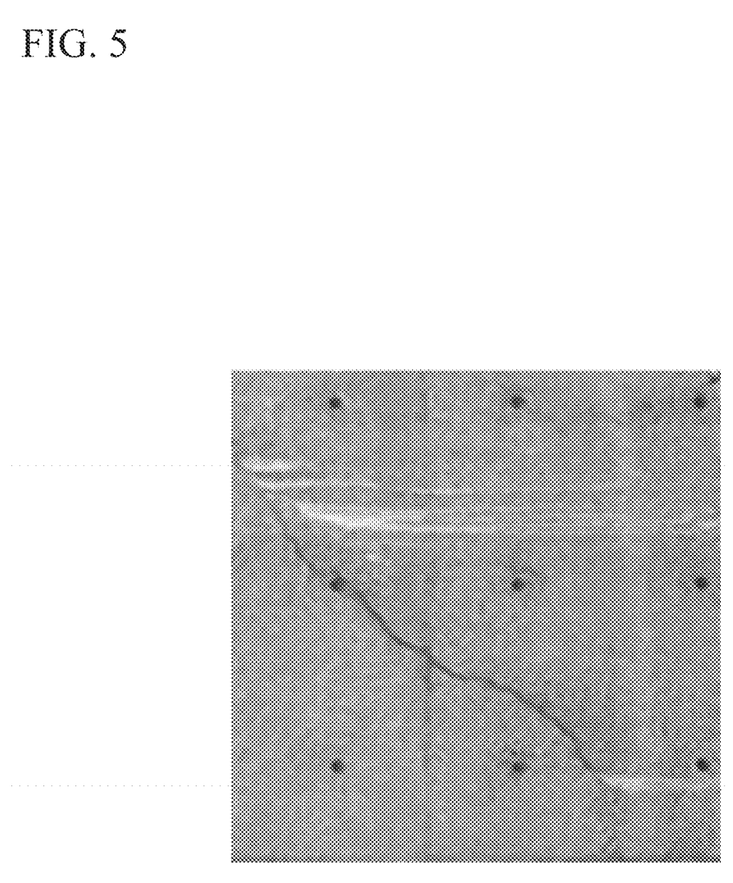
FIG. 5 illustrates an example of an image after image processing by the same measuring apparatus.

Next, the process shifts to Step S105, and the crack image diagnosing unit 24 functions. The crack image diagnosing unit 24 performs image processing to identify a position of the cracked portion. The crack image diagnosing unit 24 captures an image of a detection position with a temperature difference detected in the narrow range detection, by the image pickup unit 21. The detection position of a cracked portion detected by the infrared image pickup unit 22 is identified based on an orthogonal coordinate system having an origin set to an optical axis of the distance-measuring light, so that the crack image diagnosing unit 24 turns designated angles determined through the narrow range detection by the infrared image pickup unit 22, and captures an image (may be plural in number) by the image pickup unit 21 so that the image (images) includes respective cracked portions. The crack image diagnosing unit 24 identifies a position of the cracked portion from a high-resolution image in units of pixels by analyzing a density difference in the image. FIG. 5 illustrates an example of an image after image processing by the measuring apparatus 2. It is also preferable that the image of the cracked portion obtained in Step S205 is displayed together with a serial number on the display unit 15 of the measuring apparatus 2.

Figure 6:
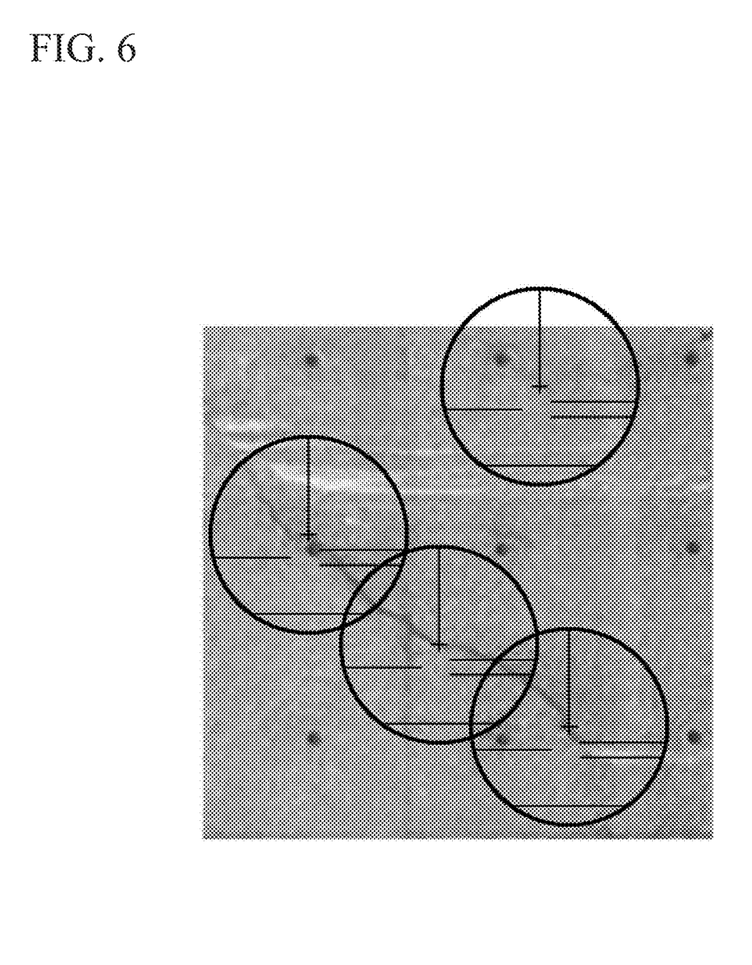
FIG. 6 is an imaginary view of a crack measurement by the same measuring apparatus.

Next, the process shifts to Step S106, and a measurement of the cracked portion is performed by the crack image diagnosing unit 24. The crack image diagnosing unit 24 identifies coordinates of a start point, a break point (may be plural in number), and a terminal point of a crack from the captured image of the cracked portion obtained in Step S105 by image processing for extracting, for example, contrast and shade changes as end points and break points. Coordinates of the start point, the break point, and the terminal point are identified by position based on an orthogonal coordinate system having an origin set to the optical axis of the distance-measuring light in the image pickup unit 21. FIG. 6 is an imaginary view of the crack measurement by the measuring apparatus 2, and illustrates an image of identification of the start point, the break point, and the terminal point. The crack image diagnosing unit 24 emits distance-measuring light to each point and measures a distance and an angle to the point while making the horizontal rotation driving unit 13 and the vertical rotation driving unit 14 collaborate with each other. The crack image diagnosing unit 24 then acquires three-dimensional absolute coordinates of the start point, the break point, and the terminal point of the crack.

Figure 7:
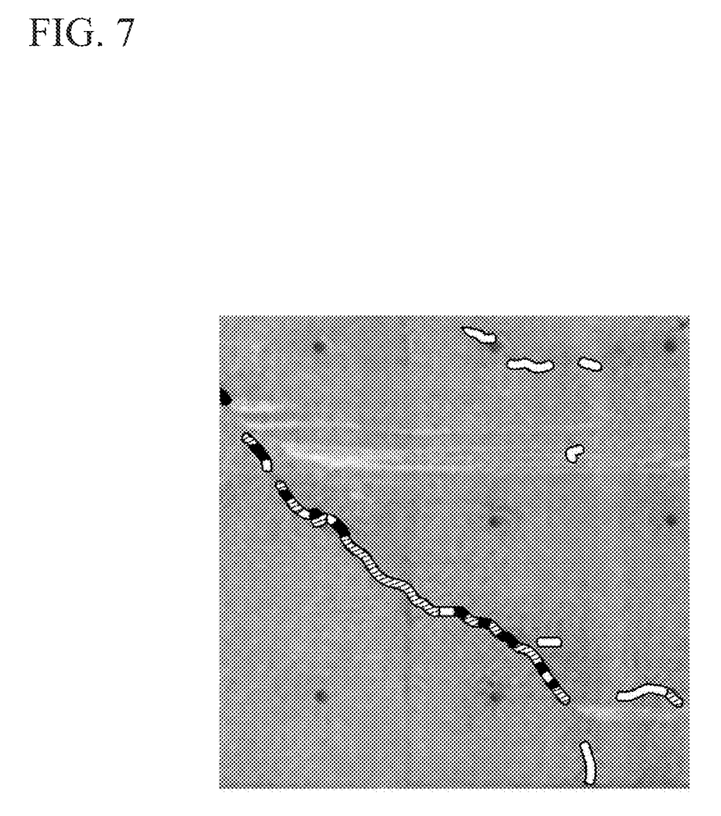
FIG. 7 illustrates an example of a result of the crack measurement by the same measuring apparatus.

Next, the process shifts to Step S107, and dimensions of the cracked portion (a length, a shape, and a thickness of the crack) are measured by the crack image diagnosing unit 24. The crack image diagnosing unit 24 measures the length and the shape of the crack from three-dimensional absolute coordinates of the start point, the break point, and the terminal point of the crack. The thickness of the crack is measured from the number of pixels of the image pickup unit 21. FIG. 7 illustrates an example of a result of the crack measurement by the measuring apparatus 2. The result is displayed on the display unit 15. As illustrated in FIG. 7, it is also preferable that cracked portions are sorted by attributes according to their lengths, shapes, and thicknesses, and color-coded and displayed on the display unit 15. It is also possible that data of the result displayed on the display unit 15 is transferred to a CAD (Computer Aided Design) machine and drawn.

As described above, according to the measuring apparatus 2 of the present embodiment, a series of measurement operations relating to three-dimensional measurements of a cracked portion, including search for the cracked portion, identification of a position of the cracked portion, a measurement of the position of the cracked portion (measurement of three-dimensional absolute coordinates) and measurements of dimensions of the cracked portion (measurements of a length, a shape, and a thickness of the crack) can all be automated.

Moreover, the measuring apparatus 2 is a composite apparatus obtained by integrating an electro-optical distance-measuring instrument for measuring a distance, a theodolite for measuring an angle, an image sensor, an infrared sensor, and an image diagnosing function into one, and can therefore easily perform data processing for positional matching among acquisitions by the respective sensors. Accordingly, compared to an apparatus in which respective sensors are separately installed and in which acquired data needs to be associated with each other for each sensor, human labor and operation mistakes are significantly reduced.

Moreover, according to the measuring apparatus 2, operation of the three-dimensional measurements of a cracked portion are completed at the measurement site. Therefore, the trouble of bringing back data from the site and performing data processing by using analyzing software can be omitted, so that the construction period and delivery time can be shortened. In addition, at the site, if an operator checks a result and finds that there is some deficiency, a cracked portion in question can be measured again and the deficiency can be supplemented at the site. Therefore, it is also possible to prevent the trouble of going out to and returning from the site.

In the embodiment described above, the distance-measuring light emitting unit (distance-measuring unit) 19, the image pickup unit 21, and the infrared image pickup unit 22 are positionally matched by setting their origins to the optical axis of the distance-measuring light, however, concerning the dispositions of the image pickup unit 21 and the infrared image pickup unit 22 inside the telescope 2c, offset values in the horizontal direction and the vertical direction with respect to the optical axis of the distance-measuring light are made known in advance, so that when the optical axis of the distance-measuring light is at a known point other than the origin on their respective pixels, the image pickup unit 21 and the infrared image pickup unit 22 can be positionally matched by taking the offset values into consideration. It is also preferable that the measuring apparatus 2 is provided with a function to detect and register offset values of the image pickup unit 21 and the infrared image pickup unit 22 with respect to the optical axis of the distance-measuring light, and the origins of the three are matched by adjusting secular changes before measurements.

Although embodiments and modifications of a preferred crack measuring apparatus and measuring method of the present invention have been described above, each embodiment and each modification can be combined based on knowledge of a person skilled in the art, and such a combined embodiment is also included in the scope of the present invention.

REFERENCE SIGNS LIST

2 Measuring apparatus
11 Horizontal angle detector (angle-measuring unit)
12 Vertical angle detector (angle-measuring unit)
13 Horizontal rotation driving unit
14 Vertical rotation driving unit
15 Display unit
16 Operation unit
17 Storage unit
18 Arithmetic control unit
19 Distance-measuring light emitting unit (distance-measuring unit)
20 Distance-measuring light receiving unit (distance-measuring unit)
21 Image pickup unit
22 Infrared image pickup unit
23 Infrared image diagnosing unit
24 Crack image diagnosing unit

The invention claimed is:

1. A crack measuring apparatus comprising:
a distance-measuring unit that measures a distance to a target by emitting distance-measuring light to the target and receiving reflected distance-measuring light;
an image pickup unit having pixels the positions of which are identified on an imaging device;
an infrared image pickup unit that has pixels the positions of which are identified on an imaging device and has sensitivity to infrared rays;
a driving unit that turns the distance-measuring unit, the image pickup unit, and the infrared image pickup unit in a horizontal direction and a vertical direction;
an angle-measuring unit that measures rotation angles in the horizontal direction and the vertical direction of the distance-measuring unit, the image pickup unit, and the infrared image pickup unit; and
an arithmetic control unit that controls the distance-measuring unit, the angle-measuring unit, the image pickup unit, the infrared image pickup unit, and the driving unit,
wherein the arithmetic control unit performs a search for a cracked portion from a temperature difference in an infrared image by turning the infrared image pickup unit, captures an image of the cracked portion by the image pickup unit, and identifies a position of the cracked portion from a density difference in the captured image, measures the position of the cracked portion by the distance-measuring unit and the angle-measuring unit, and acquires three-dimensional absolute coordinates of the cracked portion, and
wherein the arithmetic control unit performs the search a plurality of times while narrowing the temperature difference set in the infrared image pickup unit in a phased manner.

2. The crack measuring apparatus according to claim 1, wherein the image pickup unit and the infrared image pickup unit have an orthogonal coordinate system having an origin set to an optical axis of the distance-measuring light.

3. The crack measuring apparatus according to claim 1, wherein the arithmetic control unit acquires three-dimensional absolute coordinates of each of a start point, a break point, and a terminal point of the cracked portion.

4. The crack measuring apparatus according to claim 1, wherein the arithmetic control unit measures a length and a shape of a crack based on the three-dimensional absolute coordinates of the cracked portion, and measures a thickness of the crack from the number of pixels of the image pickup unit.

5. The crack measuring apparatus according to claim 1, wherein the distance-measuring unit, the angle-measuring unit, the image pickup unit, and the infrared image pickup unit are integrated into one apparatus.

6. A crack measuring method of operation of an apparatus including a distance-measuring unit that measures a distance to a target by emitting distance-measuring light to the target and receiving reflected distance-measuring light; an image pickup unit having pixels the positions of which are identified on an imaging device; an infrared image pickup unit that has pixels the positions of which are identified on an imaging device and has sensitivity to infrared rays; a driving unit that turns the distance-measuring unit, the image pickup unit, and the infrared image pickup unit in a horizontal direction and a vertical direction, and an angle-measuring unit that measures rotation angles in the horizontal direction and the vertical direction of the distance-measuring unit, the image pickup unit, and the infrared image pickup unit; comprising:

(a) a step of searching for a cracked portion from a temperature difference by turning the infrared image pickup unit while narrowing the temperature difference set in the infrared image pickup unit in a phased manner a plurality of times;

(b) a step of identifying a position of the cracked portion by capturing an image of the cracked portion searched for in Step (a) by the image pickup unit from a density difference in the captured image; and (c) a step of acquiring three-dimensional absolute coordinates by measuring a distance and an angle to the position of the cracked portion identified in Step (b) by the distance-measuring unit and the angle-measuring unit.

7. A crack measuring method of operation of an apparatus including a distance-measuring unit; an image pickup unit; an infrared image pickup unit that has pixels the positions of which are identified on an imaging device and has sensitivity to infrared rays, and an angle-measuring unit that measures rotation angles in the horizontal direction and the vertical direction of the distance-measuring unit, the image pickup unit, and the infrared image pickup unit; comprising:

(a) a step of searching for a cracked portion from a temperature difference by turning the infrared image pickup unit while narrowing the temperature difference set in the infrared image pickup unit in a phased manner a plurality of times;

(b) a step of identifying a position of the cracked portion by capturing an image of the cracked portion searched for in Step (a) by the image pickup unit from a density difference in the captured image; and (c) a step of acquiring three-dimensional absolute coordinates by measuring a distance and an angle to the position of the cracked portion identified in Step (b) by the distance-measuring unit and the angle-measuring unit.

* * * * *